INVENTOR
RAYMOND C. FISCHER

ATT'Y

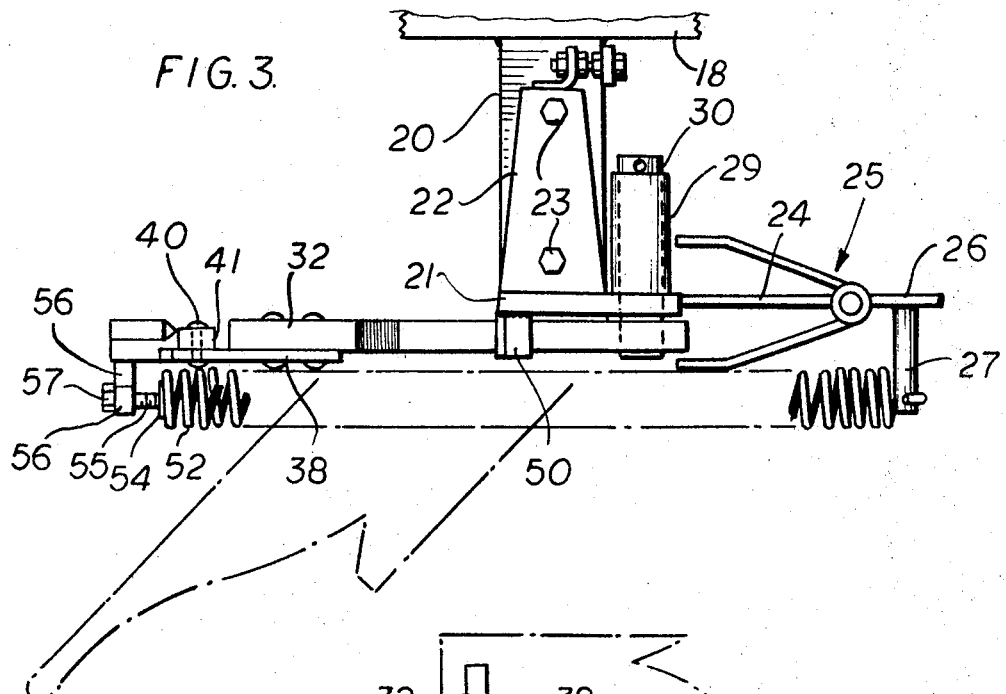
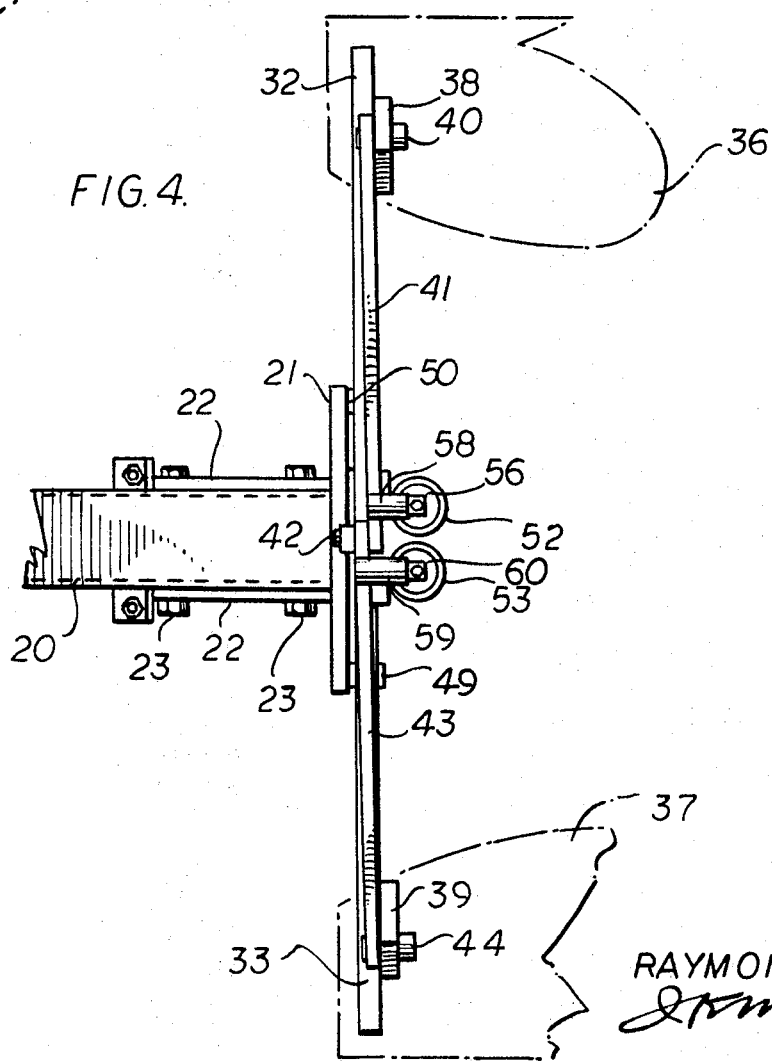

3,517,748
TWO-WAY PLOW TRIP
Raymond C. Fischer, Hinsdale, Ill., assignor to International Harvester Company, Chicago, Ill., a corporation of Delaware
Filed Aug. 26, 1968, Ser. No. 755,047
Int. Cl. A01b 5/14, 61/00, 35/24
U.S. Cl. 172—224                       4 Claims

ABSTRACT OF THE DISCLOSURE

An automatic return beam trip for a two-way plow wherein the right- and the left-hand plow units are mounted approximately 180° apart on a support which is rotatable about a longitudinal axis. The plow units are mounted on the support for tripping of the operating unit under abnormal draft load independently of the non-operating unit, and means are provided for returning the tripped unit to its operating position.

BACKGROUND OF THE INVENTION

This invention relates to plows and particularly to a two-way plow. More specifically, the invention concerns automatic return trip mechanism for a two-way plow.

It is known to provide tripping mechanism for the earth-working units of one-way plows and the like wherein the tripped unit returns to its operating position automatically. In a two-way plow of the roll-over type the inoperative plow unit is usually spaced 180° from the operating unit in substantially the same plane, and one of the principal problems encountered has been in attempting to mount the units so as to accommodate tripping of the operating unit without interfering with the non-operating unit, and forcing the tripped unit to return to its operating position automatically.

The principal object of the present invention, therefore, is the provision of novel means for mounting the alternately operating units of a two-way plow to accommodate tripping of the operating unit when an obstacle is encountered.

Another object of the invention is the provision of novel tripping means for the elements of a two-way plow accommodating tripping of the operating unit independently of the non-operating unit, incorporating means for automatically returning the tripped unit to its operating position.

DESCRIPTION OF THE DRAWINGS

FIG. 3 is a plan view of a portion of the structure shown in FIG. 1, with parts removed; and FIG. 4 is a diagrammatic rear elevation of the structure shown in FIG. 3.

DESCRIPTION OF THE PREFERRED EMBODIMENT

Figure 1:
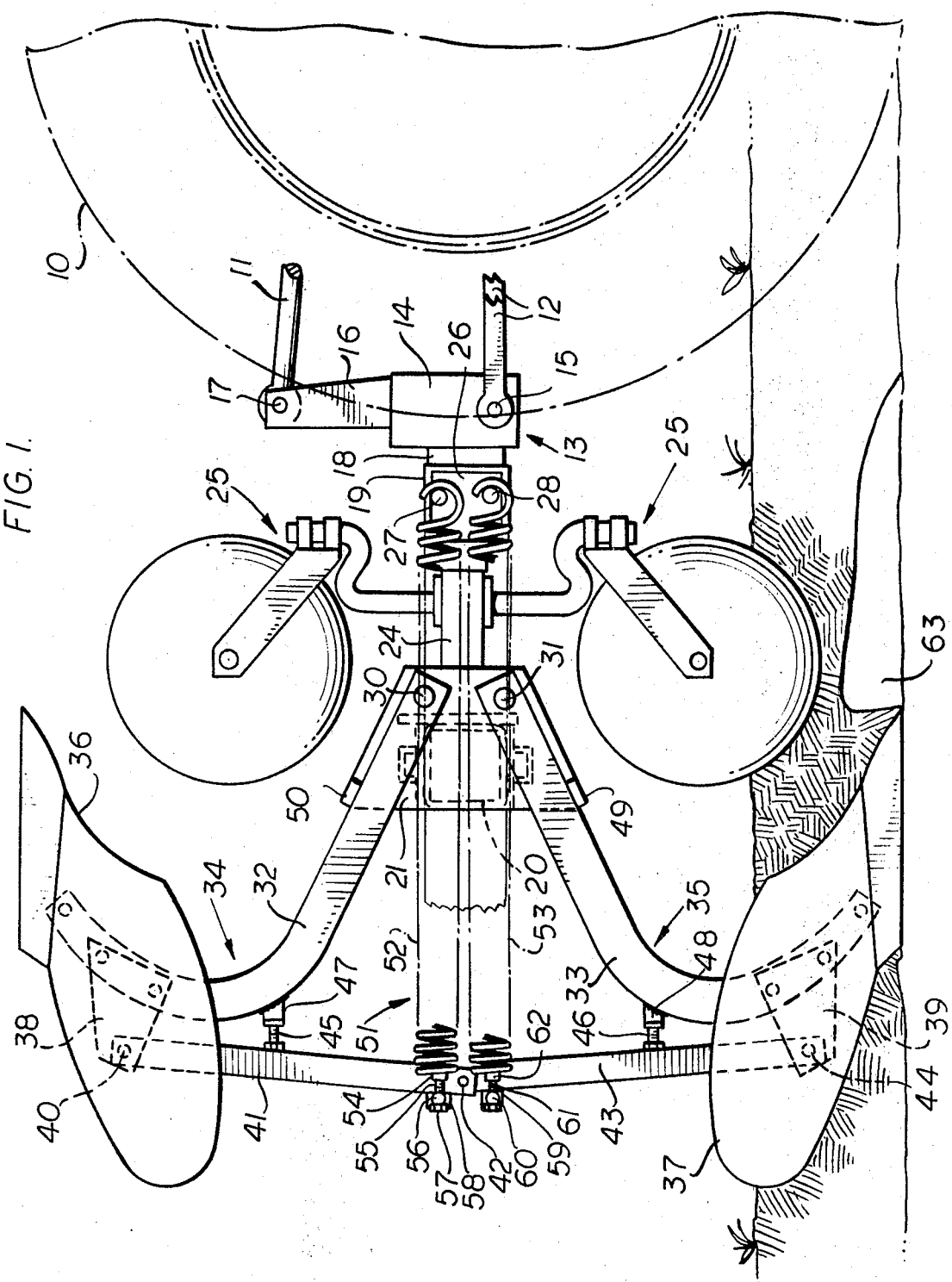
FIG. 1 is a view in side elevation showing a two-way plow incorporating the features of this invention mounted on a tractor, with one of the units in operating position.

In the drawings the numeral 10 designates a tractor provided with a conventional three-point implement hitch including an upper link 11 and a pair of lower laterally spaced links 12 the forward ends of which are connected to the tractor by means accommodating vertical movement of the links between positions corresponding to the raised and lowered positions of an implement.

The implement shown in the drawings is a two-way plow having a frame shown diagrammatically and designated by the numeral 13 and including a forward transversely extending member 14 having a pin 15 at each end, only one of which is shown, for the pivotal connection thereto of the rear ends of each of the lower links 12, and having centrally affixed thereto a mast 16 carrying a pivot pin 17 to which is connected the rear end of a upper link 11.

Also centrally affixed to the transverse structural member 14 and extending rearwardly therefrom is a cylindrical support 18 upon which is mounted, for rotation by conventional means, not shown but well known in the art, a tubular plow carrier 19, to the rear portion of which is secured and extending laterally outwardly therefrom, a supporting beam 20, square in cross section. A trapezoidally shaped vertically extending plate 21 abuts the outer end of beam 20 and has vertically spaced flanges 22 affixed to beam 20 by bolts 23.

Also secured to beam 20 and extending forwardly therefrom near its outer end is a supporting member 24 for a pair of conventional colter assemblies 25. Support 24 has a forward extension 26 to which are secured a pair of vertically spaced laterally projecting pegs 27 and 28 performing a function hereinafter to be described.

Affixed to and extending laterally inwardly from plate 21 are vertically spaced sleeves 29, only one of which is shown, in which are rotatably mounted pivot pins 30 and 31 on the outer ends of which are mounted the forward ends of beams 32 and 33 of alternately operating left- and right-hand moldboard plow units 34 and 35, respectively.

Figure 2:
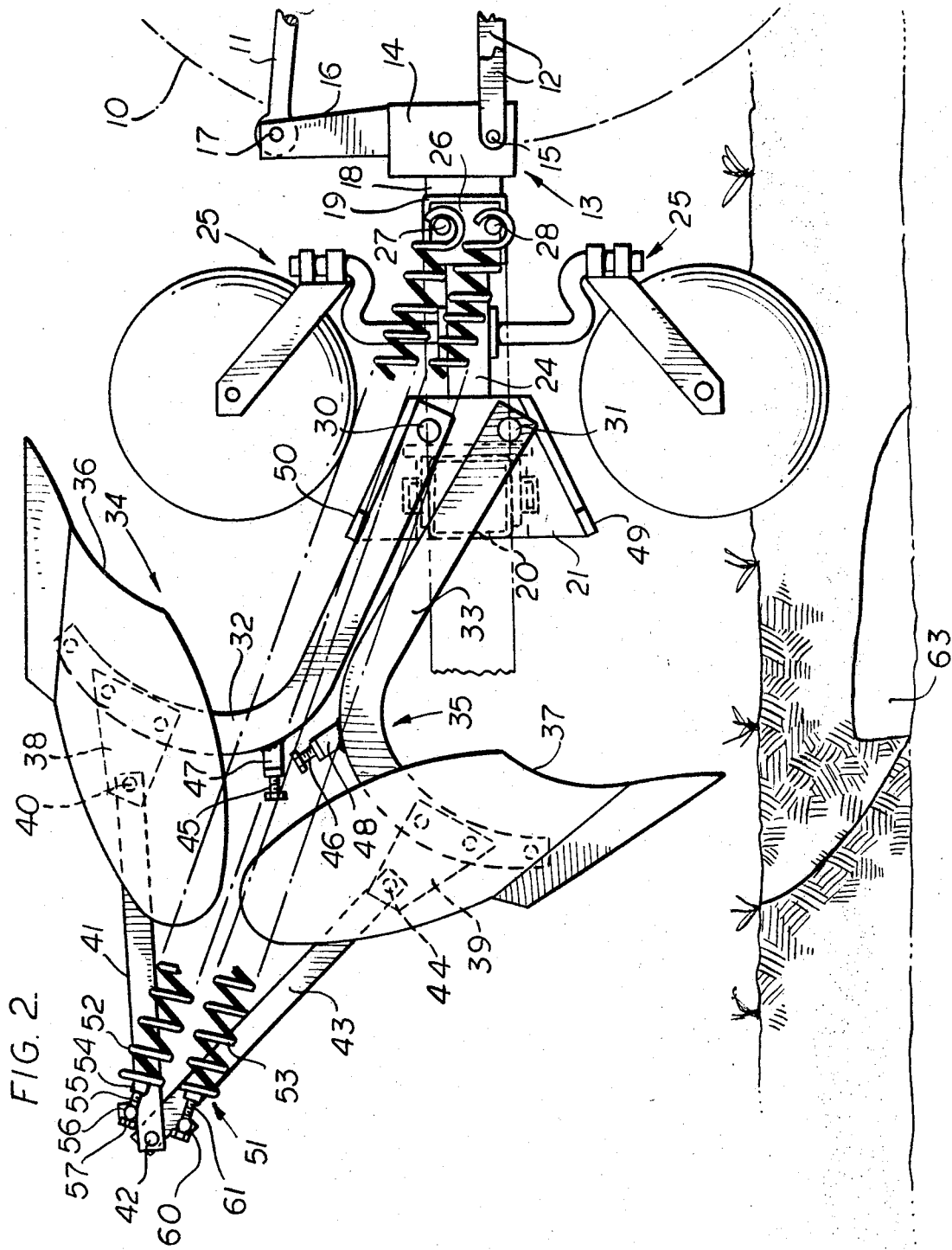
FIG. 2 is a view similar to FIG. 1 but showing the position of the parts when the operating unit has tripped due to striking an obstruction.

As shown in FIGS. 1 and 2, the rear ends of beams 32 and 33 are curved in opposite directions and have secured to their ends left- and right-hand plow bottoms 36 and 37, respectively. Plates 38 and 39 are affixed to the rear ends of the respective beams 32 and 33, and pivotally connected to plate 38 by pin 40 is one end of a link 41, which extends generally vertically in FIG. 1 and is pivotally connected by a pin 42 at its other end to another link 43, the other end of which is mounted on a pin 44 carried by plate 39.

As shown in the operating position of the plow in FIG. 1, links 41 and 43 are in general vertical alignment but the axis of pivot pin 42 is disposed rearwardly overcenter with relation to a line between the axes of pivot pins 40 and 44. In the operating position of FIG. 1, links 41 and 43 are adjustably held in the position shown by engagement of the respective links with bolts 45 and 46 receivable in threaded sleeves 47 and 48 affixed, as by welding, to the respective beams 32 and 33.

In FIG. 1 the right-hand plow unit 35 is in operating position with beam 33 engaging a stop in the form of a laterally projecting lug 49 integral with plate 21, an oppositely disposed stop 50 on plate 21 being engageable with beam 32 of the left-hand or alternately operating plow unit 34 shown in its non-operating position. The operating unit 35 is held in the position shown in FIG. 1 under normal operating conditions and unit 34 is retained in the non-operating position by holding links 41 and 43 in a position approaching alignment, as shown, with pivot 42 disposed somewhat rearwardly of a line between the axes of pivot pins 40 and 44.

Links 41 and 43 are held in the position of FIG. 1 by yieldable means 51 comprising a pair of longitudinally extending springs 52 and 53, anchored at their forward ends to pegs 27 and 28. The rear end of spring 52 is affixed to a threaded block 54 adjustably receiving a bolt 55 slidable in a swivel 56 and having a head 57, the swivel being mounted on a lug 58 affixed to and extending laterally from the lower end of link 41. A lug 59 is affixed to the upper end of link 43 and carries swivel 60 receiving the shank of another bolt 61 threaded into a block 62 affixed to the rear end of spring 53. Bolts 55 and 61 are adjustable in blocks 54 and 62 to adjust the tension on springs 52 and 53.

In the operating position of FIG. 1, when the plow bottom 37 engages an obstruction such as is indicated at 63, the tension on springs 52 and 53 is overcome, the toggle represented by links 41 and 43 is broken, beam 33 swings upwardly about the pivot axis of pin 31, and the operating unit 35 trips to the position shown in FIG. 2 with links 41 and 43 disposed in the manner shown. Upward swinging of unit 35 is limited by engagement of beam 33 with beam 32. The tension on springs 52 and 53 forces pivot pin 42 forwardly and downwardly and returns links 41 and 43 to the position of FIG. 1. The moment of spring force is greater than the moment of soil resistance, resulting in automatic return of the bottom, on the go, without raising the plow. The same tripping action is accommodated when the alternate or left-hand unit 34 is placed in operation by rotation of the flow carrier 19 about its axis.

It is believed that the construction and operation of the novel trip mechanism for two-way plow according to this invention will be clearly understood from the foregoing description.

What is claimed is:

1. Automatic return trip mechanism for the right- and left-hand plow units of a two-way plow of the roll-over type said plow having a generally longitudinal supporting frame, wherein the plow beam of each of the units is mounted on said frame for tripping of the operating plow unit rearwardly and upwardly about a transverse axis, the plow beams of said plow units being disposed in a common vertical plane during operation with their forward ends pivotally connected to the frame, the beam of the operating plow unit upon tripping being engageable with the beam of the other plow unit to limit the tripping movement of the operating unit, a pair of links pivotally interconnected at their inner ends extending between and having their other ends pivotally connected to the respective of said plow units, the axis of pivotal interconnection of said links being disposed rearwardly of a center line between the pivotal connections of the other ends of said links to said plow units, the inner ends of said links being movable rearwardly upon tripping of the operating plow unit, and means operatively connected at one end to the frame and at its other end to said links to oppose said rearward movement of the links and to automatically return the tripped unit to its operating position, said means comprises spring means disposed between said plow units and anchored at one end to the plow frame and at its other end to said links adjacent the axis of interconnection of said links.

2. The invention set forth in claim 1, wherein adjustable stop means are provided on the plow units and engageable with said links to limit the forward movement of the axis of pivotal interconnection of said links.

3. Automatic return trip mechanism for the right-and left-hand plow units of a two-way plow of the roll-over type said plow having a generally longitudinal supporting frame, wherein the plow beam of each of the units is mounted on the frame for tripping of the operating plow unit rearwardly and upwardly about a transverse axis, a pair of links pivotally interconnected at their inner ends extending between and having their other ends pivotally connected to the respective of said plow units, the axis of pivotal interconnection of said links being disposed rearwardly of a center line between the pivotal connections of the other ends of said links to said plow units, the inner ends of said links being movable rearwardly upon tripping of the operating plow unit, and spring means operatively connected at one end to the frame and at its other end to said links to oppose said rearward movement of the links and to return the tripped unit to its operating position.

4. The invention set forth in claim 3, wherein adjustable stop means are provided on the plow units and engageable with said links to limit the forward movement of the axis of pivotal interconnection of said links.

References Cited

UNITED STATES PATENTS

| 2,913,059 | 11/1959 | Toland et al. | 172—224 |
| 3,416,611 | 12/1968 | Fischer | 172—261 |
| 3,420,315 | 1/1969 | Roth | 172—265 |

ROBERT E. PULFREY, Primary Examiner

S. C. PELLEGRINO, Assistant Examiner

U.S. Cl. X.R.

172—265, 705